United States Patent
Uehara

(10) Patent No.: US 9,924,059 B2
(45) Date of Patent: Mar. 20, 2018

(54) APPARATUS HAVING POWER-SAVING FUNCTION, METHOD OF PROCESSING INFORMATION, AND COMPUTER PROGRAM PRODUCT

(71) Applicant: Noriyuki Uehara, Kanagawa (JP)

(72) Inventor: Noriyuki Uehara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/392,029

(22) Filed: Dec. 28, 2016

(65) Prior Publication Data
US 2017/0201641 A1    Jul. 13, 2017

(30) Foreign Application Priority Data

Jan. 13, 2016  (JP) ................. 2016-004678
Nov. 25, 2016  (JP) ................. 2016-229402

(51) Int. Cl.
*H04N 1/00*    (2006.01)

(52) U.S. Cl.
CPC .  *H04N 1/00891* (2013.01); *H04N 2201/0094* (2013.01)

(58) Field of Classification Search
USPC ........................................... 358/1.13
See application file for complete search history.

(56) References Cited

U.S. PATENT DOCUMENTS

2008/0141050 A1*  6/2008  Senda ............... H04N 1/00127
                                                    713/321
2016/0274958 A1*  9/2016  Uehara .................. G06F 9/542

FOREIGN PATENT DOCUMENTS

JP    2007-068156    3/2007
JP    2011-164904    8/2011

* cited by examiner

*Primary Examiner* — Ngon Nguyen
(74) *Attorney, Agent, or Firm* — Harness, Dickey & Pierce, P.L.C.

(57) ABSTRACT

An apparatus having a power-saving function includes first circuitry to control a transition of a power control state of the apparatus between a power-saving mode and a normal operating mode, and a communication interface to connect with an operating device to receive a user instruction from the operating device. The operating device includes second circuitry to control a transition of a power control state of the operating device between the power-saving mode and the normal operating mode. The first circuitry determines whether a combination of the power control state of the apparatus and the power control state of the operating device indicates occurrence of a trouble to the apparatus, and sends a notification to the operating device based on a determination.

13 Claims, 6 Drawing Sheets

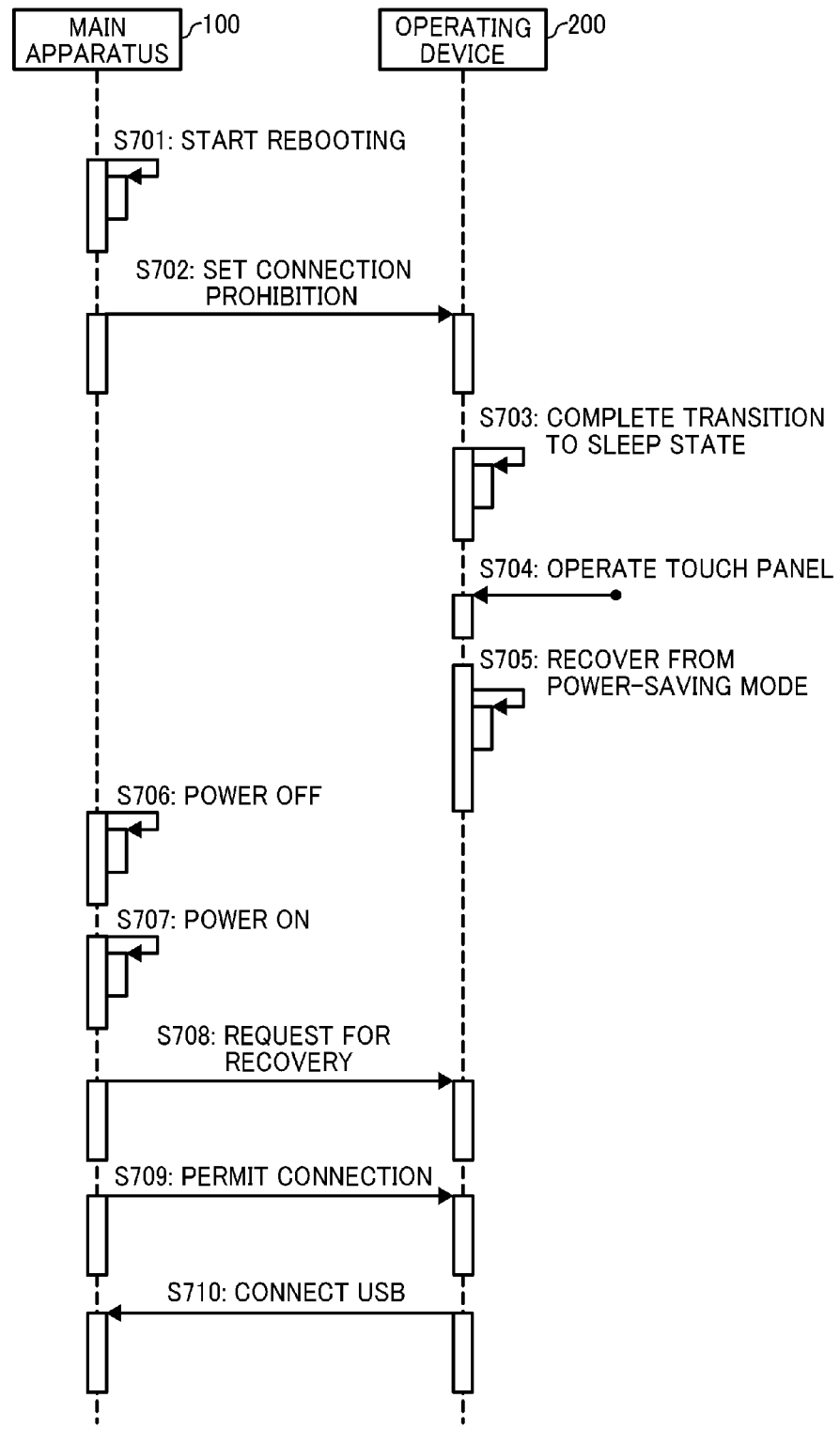

APPARATUS HAVING POWER-SAVING FUNCTION, METHOD OF PROCESSING INFORMATION, AND COMPUTER PROGRAM PRODUCT

CROSS-REFERENCE TO RELATED APPLICATIONS

This patent application is based on and claims priority pursuant to 35 U.S.C. § 119(a) to Japanese Patent Application Nos. 2016-004678, filed on Jan. 13, 2016, and 2016-229402, filed on Nov. 25, 2016, in the Japan Patent Office, the entire disclosures of which are hereby incorporated by reference herein.

BACKGROUND

Technical Field

Embodiments of the present disclosure relate to an apparatus having a power-saving function, a method of processing information, and a computer program product.

Description of the Related Art

Systems such as copiers, facsimile communication devices, printers, scanners, and multifunction peripherals having two or more functions of the copier, the facsimile communication device, the printer, and the scanner, may include operating devices operated by a user. In the system such as a multifunction peripheral including the operating device, the operating device and a main apparatus are connected to each other through a communication path. Each of the operating device and the main apparatus in the system may use a different type of operating system (OS) to operate and have a different function, individually and independently. Such a system configuring with the main apparatus and the operating device, and each of which operates individually and independently, also controls power supply of each of the main apparatus and the operating device individually and independently.

In general, to reduce power consumption in an apparatus such as a multifunction peripheral, the apparatus transitions to a power-saving mode when detecting an idle state, and transitions to a normal operating mode when detecting a predetermined condition for recovering (returning) to the normal operating mode (recovery condition).

A type of an apparatus having a function to control transition to the power-saving mode that includes a sub control system that operates in the power-saving mode, in addition to a main control system, which controls operation of the whole apparatus operating in the normal operating mode, has been known. The sub control system included in the apparatus manages power supply of the main control system, and operates in the power-saving mode. That is, a central processing unit (CPU) of the main control system turns off and the sub control system responses to network and monitors the apparatus, when the apparatus is in the power-saving mode. The main control system returns to an on state when the apparatus returns to the normal operating mode from the power-saving mode. Through this, the apparatus reduces the power consumption.

SUMMARY

An apparatus having a power-saving function includes first circuitry to control a transition of a power control state of the apparatus between a power-saving mode and a normal operating mode, and a communication interface to connect with an operating device to receive a user instruction from the operating device. The operating device includes second circuitry to control a transition of a power control state of the operating device between the power-saving mode and the normal operating mode. The first circuitry determines whether a combination of the power control state of the apparatus and the power control state of the operating device indicates occurrence of a trouble to the apparatus, and sends a notification to the operating device based on a determination.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings;

FIG. 7 is a sequence diagram illustrating operation of controlling transition of the multifunction peripheral according to an embodiment.

DETAILED DESCRIPTION (OF THE INVENTION)

Figure 1:
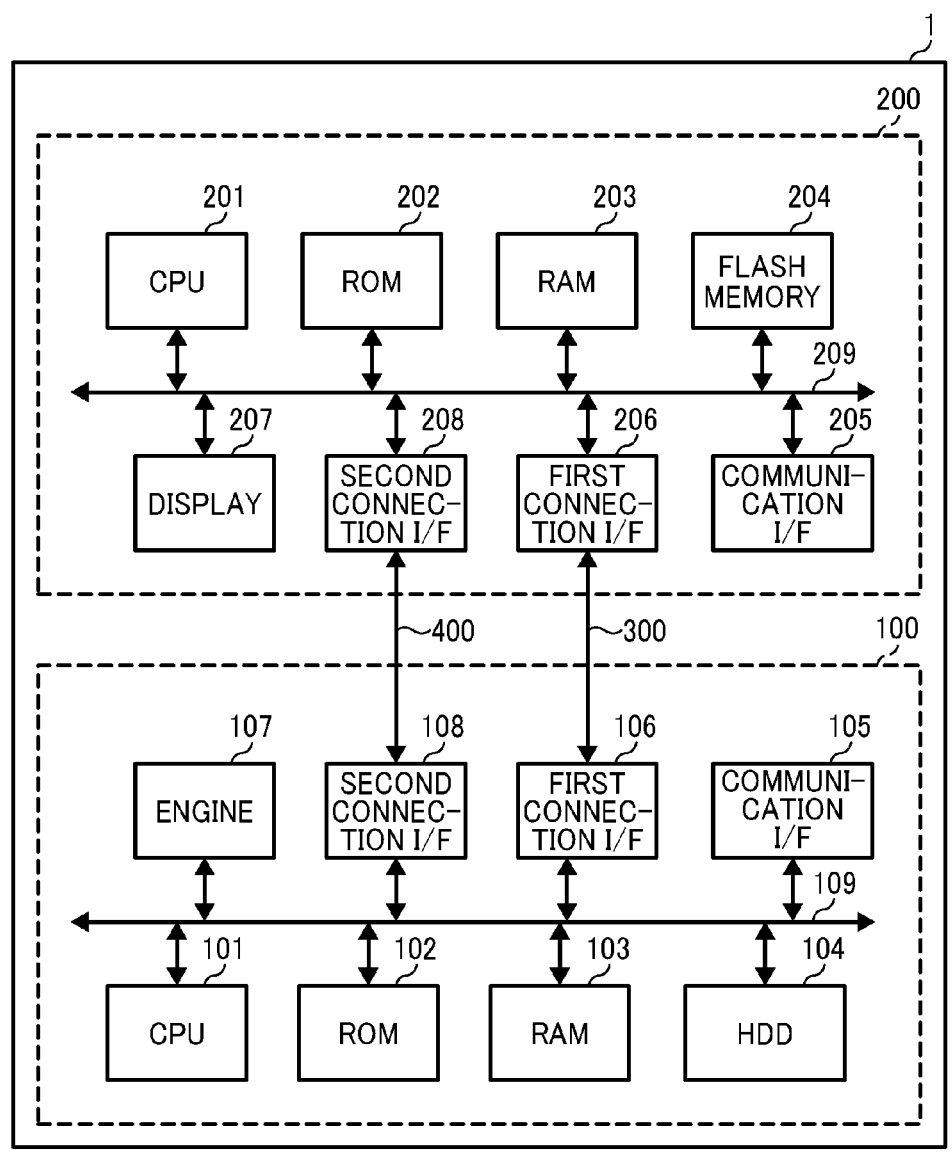
FIG. 1 is a diagram illustrating a hardware configuration of a system, which includes a multifunction peripheral and an operating device, according to one embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing example embodiments illustrated in the drawings, specific terminology is employed for the sake of clarity. However, the present disclosure is not intended to be limited to the specific terminology so selected and it is to be understood that each specific element includes all technical equivalents that, have the same function, operate in a similar manner, and achieve the same result.

A system including an operating device, a method of processing information and non-transitory recording medium, according to one of embodiments of the present disclosure, will be described with reference to the drawings. In the following description, a multifunction peripheral (MFP) is used as an example of such a system. The system including the operating device in the disclosure, however, is not limited to the MFP. A copier, a facsimile communication device, a printer, a scanner, and the like may also be applied as such a system.

Referring to FIG. 1, an MFP 1, according to one embodiment, includes a main apparatus (first device) 100 that has various types of functions such as a copy function, a scan function, a facsimile communication function, and a print function, and an operating device (second device) 200 that accepts an input from a user for operation.

The main apparatus 100 includes a central processing unit (CPU) 101, a read only memory (ROM) 102, a random access memory (RAM) 103, a hard disk drive (HDD) 104, a main apparatus-communication interface (I/F), a main apparatus-first connection I/F 106, an engine 107, and a main apparatus-second connection I/F 108, which are connected to each other through a system bus 109.

The main apparatus 100 operates according to the input accepted with the operating device 200. The main apparatus 100 is also able to communicate with an external device, such as a client personal computer (PC), and operable in accordance with an instruction received from the external device.

The CPU 101 controls the entire operation of the main apparatus 100. The CPU 101 executes an application program stored in the ROM 102 or the HDD 104, while using the RAM 103 as a work area. Through this, the CPU 101 performs various types of functions including the copy function, the scanner function, the facsimile communication function, and the print function.

The engine 107 is a hardware that performs general processing for the copy function, the scanner function, the facsimile communication function, and the print function, except for information processing and communication processing. The engine 107 includes, for example, a scanner (image reading device) that scans and reads an image of a document, a plotter (image forming device) that prints the image on sheet member such as a sheet of paper, and facsimile communication device that carries out facsimile communication. The engine 107 also may include optional devices, such as a finisher that sorts printed sheets and an automatic document feeding device (ADF) that automatically feeds the document, and thus provide specific options.

The main apparatus-communication I/F 105 is an interface to establish communication between the main apparatus 100 and the external device, such as a client PC. The main apparatus-first connection I/F 106 is an interface with which the main apparatus 100 communicates with the operating device 200 through a first communication path 300. In FIG. 1, the first communication path 300 is indicated by an actual line, however, connection using the first communication path 300 may be wireless. The operating device 200 is removable from the main apparatus 100 to freely connect or disconnect to or from the main apparatus 100. When the operating device 200 is physically connected with the main apparatus 100, the first communication path 300 establishes wired communication, otherwise, when the operating device 200 is separated from the main apparatus 100, the first communication path 300 can establish wireless communication.

The operating device 200 includes a CPU 201, a ROM 202, a RAM 203, a flash memory 204, an operating device-communication I/F 205, an operating device-first connection I/F 206, a display 207 and an operating device-second connection I/F 208, which are connected to each other through a system bus 209.

The CPU 201 integrally controls the operation of the operating device 200. The CPU 201 executes a program stored in the ROM 202 or the flash memory 204, while using the RAM 203 as a work area. Through this, the CPU 201 controls the whole operation of the operating device 200, and performs the various types of functions including displaying information (an image) according to the input accepted from the user.

The operating device-communication I/F 205 is an interface to communicate with a Web server. The operating device-communication I/F 205 is used in the wireless communication established between the main apparatus 100 and the operating device 200 that is separated from the main apparatus 100.

The operating device-first connection I/F 206 is an interface to communicate with the main apparatus 100 using the first communication path 300 which uses wired communication when the operating device 200 is physically connected with the main apparatus 100.

The display 207 accepts various types of inputs according to operations of the user, and displays various types of information that include, for example, information generated in response to the accepted input, information indicating an operating state of the MFP 1, and configuration information. One example of the display 207 includes a crystal liquid display device having a touch panel function. The display 207 may be configured with, for example, an organic electro luminescence (EL) device having the touch panel function. The display 207 may additionally include an operation part such as a hardware key and a light emitting part.

The main apparatus 100 and the operating device 200 operate using operating systems (OS) that are different from each other. The main apparatus 100 and the operating device 200, accordingly, operate individually and independently, and control power operation in each device individually and independently. In the power control operation described above, each of the main apparatus 100 and the operating device 200 transitions between two modes, one is a power-saving mode, and the other is a normal operating mode that supplies more power than the power-saving mode.

The main apparatus 100 and the operating device 200 are connected to each other, using the main apparatus-first connection I/F 106 and the operating device-first connection I/F 206, through the first communication path 300. The main apparatus 100 and the operating device 200 are also connected to each other, using the main apparatus-second connection I/F 108 and the operating device-second connection I/F 208, through the second communication path 400.

As described above, the operating device 200 is removable from the main apparatus 100 of the MFP 1. The operating device 200 communicates with the main apparatus 100 through the first communication path 300, which is a dedicated communication path, when mounted on the main apparatus 100. As the first communication path 300, for example, a universal serial bus (USB) may be used. The operating device 200 communicates with the main apparatus 100 through the second communication path 400, which is a dedicated communication path, when being mounted on the main apparatus 100. The second communication path 400 is used to establish communication between the main apparatus 100 and the operating device 200 in replace of the first communication path 300, when the main apparatus 100 performs transition to a power-saving mode during which the first communication path 300 cannot be used. The second communication path 400 is used for, for example, transferring information including a connection prohibition notification, a recovery request, and a connection permission notification, which will be described later. The connection prohibition notification, the recovery request, and the connection permission notification may be configured with signals using an inter-integrated circuit (I2C) command, when the second communication path 400 has a communication line available for I2C communication. When the second communication path 400 is a dedicated signal line, a voltage level (High/Low) corresponding to the signal line may be used.

When the operating device 200 is separated from the main apparatus 100, the operating device 200 and the main apparatus 100 are connected with each other using a wireless communication path. At this time, the operating device 200 performs a predetermined operation by operating a Web application program interface (API) via a Web interface displayed with the display 207. Examples of the wireless communication path used between the main apparatus 100 and the operating device 200 may include, Bluetooth (registered trademark), Wifi (registered trademark), and infrared communication.

The operating device 200 displays, for example, an operation screen for an application operating in the main apparatus 100 or an application being developed by a developer. The operating device 200, accordingly, serves as a control terminal device of the MFP 1. As one of examples of the operating device 200, an information processing terminal device that is an electronic device such as a tablet or a smart phone, each of which can execute the whole information processing by itself, may be used.

The main apparatus 100 provides a main control function and a sub control function, when executing a software program stored in the ROM 102 or HDD 104 with the CPU 101. The main control function is configured with a main control system that controls processing of an image input from the scanner or the other external devices included in the main apparatus 100, processing of input image data for outputting, and outputting the image. The sub control function is configured with a sub control system that controls power supply to the main control system.

Additionally, the sub control system is always able to respond to and send signals to the external devices through an interface, such as a network or a USB, which is used for inputting and outputting data, such as image data. The sub control system also controls operation of recovering (returning to a normal operating mode) from the power-saving mode, when a predetermined condition for recovering (returning) to the normal operating mode (recovery condition) is met. The recovery condition includes data input from the USB.

Each of the main apparatus 100 and the operating device 200 in the MFP 1, according to the embodiment, has the different OS to keep each function independently. That is, the main apparatus 100 and the operating device 200 in the MFP 1 operate individually and independently using each corresponding OS. As one example of the OS for the main apparatus 100, Linux (registered trademark) may be used. As one example of the OS for the operating device 200, Android (registered trademark) may be used.

The MFP 1, according to the embodiment, operates by operating the main apparatus 100 and the operating device 200 individually using the corresponding OS, so that the communication established between the main apparatus 100 and the operating device 200 is not regarded as inter-process communication in a shared device, but as communication between two different devices. For example, operation to transfer the input accepted with the operating device 200 (instruction from the user) to the main apparatus 100 (command communication) and operation to inform an event from the main apparatus 100 to the operating device 200 are performed as communication established between the two different devices. The command communication performed by the operating device 200 allows the MFP 1, according to the embodiment, to use functions of the main apparatus 100.

The event that is informed from the main apparatus 100 to the operating device 200 includes a state of operation executed in the main apparatus 100 (for example, the number of print-completed sheet, the number of sheets to be read, etc.), and setting contents set in the main apparatus 100. Additionally, the main apparatus 100 also supplies power to the operating device 200 through the first communication path 300. Accordingly, power control of the operating device 200 can be performed independently and separately from power control of the main apparatus 100.

The MFP 1, according to the embodiment, can prohibit the connection between the main apparatus 100 and the operating device 200, when a combination of power control states of the main apparatus 100 and the operating device 200 is in a status to transition to the combination that has a possibility to cause some kinds of troubles to the first communication path 300. This prevents a hardware configuring the first communication path 300 from receiving electrical stress.

Meaning of "a combination of power control states of the main apparatus 100 and the operating device 200 is in a status to transition to the combination that has a possibility to cause some kinds of troubles to the first communication path 300" will be described later.

Figure 2:
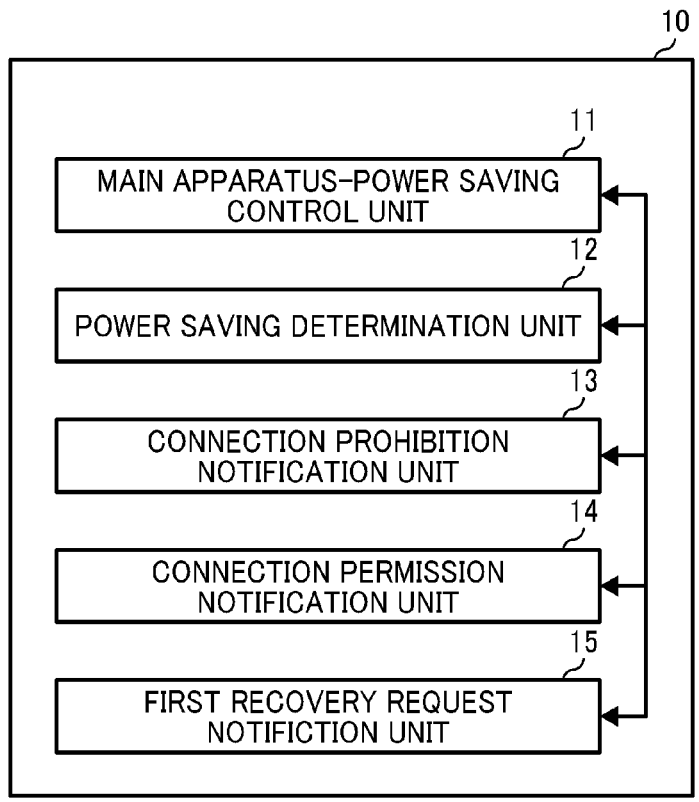
FIG. 2 is a block diagram illustrating control functions included in the multifunction peripheral of FIG. 1.
Figure 3:
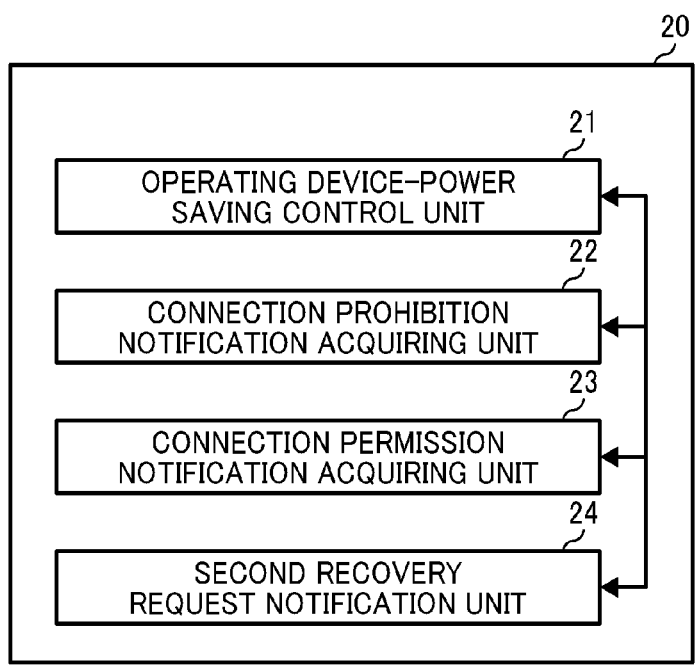
FIG. 3 is a block diagram illustrating control functions included in the operating device of FIG. 1.

Next, a functional configuration of the MFP 1 according to the embodiment is described with reference to FIG. 2 and FIG. 3. FIG. 2 is a block diagram illustrating a functional configuration associated with the main apparatus 100, as a functional block 10. Functions illustrated in the functional block 10 are executed by operation function of the CPU 101 of the main apparatus 100. FIG. 3 is a block diagram illustrating a functional configuration associated with the operating device 200, as a functional block 20. Functions illustrated in the functional block 20 are executed by operation function of the CPU 201 of the operating device 200.

As describe in FIG. 2, the functional block 10, which includes the functions related to the main apparatus side, includes a main apparatus-power-saving control unit 11, a power-saving determination unit 12, a connection prohibition notification unit 13, a connection permission notification unit 14, and a first recovery request notification unit 15.

The main apparatus-power-saving control unit 11 determines whether a condition for transitioning to the power-saving mode (transition condition) of the MFP 1 (main apparatus 100) is met. Additionally, the main apparatus-power-saving control unit 11 determines whether the condition for recovering from the power-saving mode (recovery condition) of the MFP 1 (main apparatus 100) is met. The main apparatus-power-saving control unit 11, then controls the transition of a power mode of the MFP 1 (main apparatus 100) according to results of the determination. For example, when the main apparatus 100 obtains a recovery request from the operating device 200, the main body-power-saving control unit 11 recovers the MFP 1 (main apparatus 100) from the power-saving mode.

The power-saving determination unit 12 monitors states of the power supply (power control states) of the main apparatus 100 and the operating device 200. That is, the power-saving determination unit 12 monitors whether the operating device 200 is to transition to a sleep state (power-saving mode), and whether the main apparatus 100 is to transition to the power-saving mode from the normal operating mode. The power-saving determination unit 12 also determines whether the combination of the power control states of the main apparatus 100 and the operating device 200 transitions to the status that has the possibility to cause the some kinds of abnormalities or troubles to the first communication path 300, based on results of monitoring the power states of the main apparatus 100 and the operating device 200.

The connection prohibition notification unit 13 notifies the operating device 200 of connection prohibition, when the power-saving determination unit 12 determines that the transition of the power control states of the main apparatus 100 and the operating device 200 causes some troubles or abnormalities to the first communication path 300.

The connection permission notification unit 14 sends a connection permission notification to the operating device 200 that recovers from the power-saving mode to the normal operating mode, in response to the recovery request received from the operating device 200. This occurs after the main apparatus 100 completes the transition to the power-saving mode from the normal operating mode.

The first recovery request notification unit 15 sends a recovery request to the operating device 200, after the main apparatus 100 is powered on in rebooting.

As describe in FIG. 3, the functional block 20, which includes functions related the operating device 200, includes an operating device-power-saving control unit 21, a connection prohibition notification acquiring unit 22, a connection permission notification acquiring unit 23, and a second recovery request notification unit 24.

The operating device-power-saving control unit 21 determines whether a condition for transitioning to the power-saving mode (transition condition) of the operating device 200 is met. The operating device-power-saving control unit 21 also determines whether a condition for recovering from the power-saving mode (recovery condition) of the operating device 200 is met. The operating device-power-saving control unit 21 then controls the transition of the power mode of the operating device 200 according to results of the determination. For example, in response to receipt of the recovery request from the main apparatus 100, the operating device-power-saving control unit 21 performs processing for recovering the operating device 200 from the power-saving mode.

The connection prohibition notification acquiring unit 22 stops the operating device 200 requesting USB connection to the main apparatus 100, when receiving the connection prohibition notification from the connection prohibition notification unit 13.

The connection permission notification acquiring unit 23 requests to the main apparatus 100 for the USB connection from the operating device 200 to the main apparatus 100, when acquiring the connection permission notification from the connection permission notification unit 14.

The second recovery request notification unit 24 sends a recovery request to recover the main apparatus 100 from the power-saving mode right after, or after a predetermined time passed from recovering of the operating device 200 from the power-saving mode. The second recovery request notification unit 24 also sends the recovery request again when no connection permission notification is sent from the main apparatus 100 even when the recovery request is previously sent to the main apparatus 100. That is, the second recovery request notification unit 24 repeats sending the recovery request until receiving the connection permission notification from the main apparatus 100.

Next, exemplary state transition in controlling power states in the main apparatus 100 and the operating device 200, each of which has the functions as described above, is described.

Figure 4:
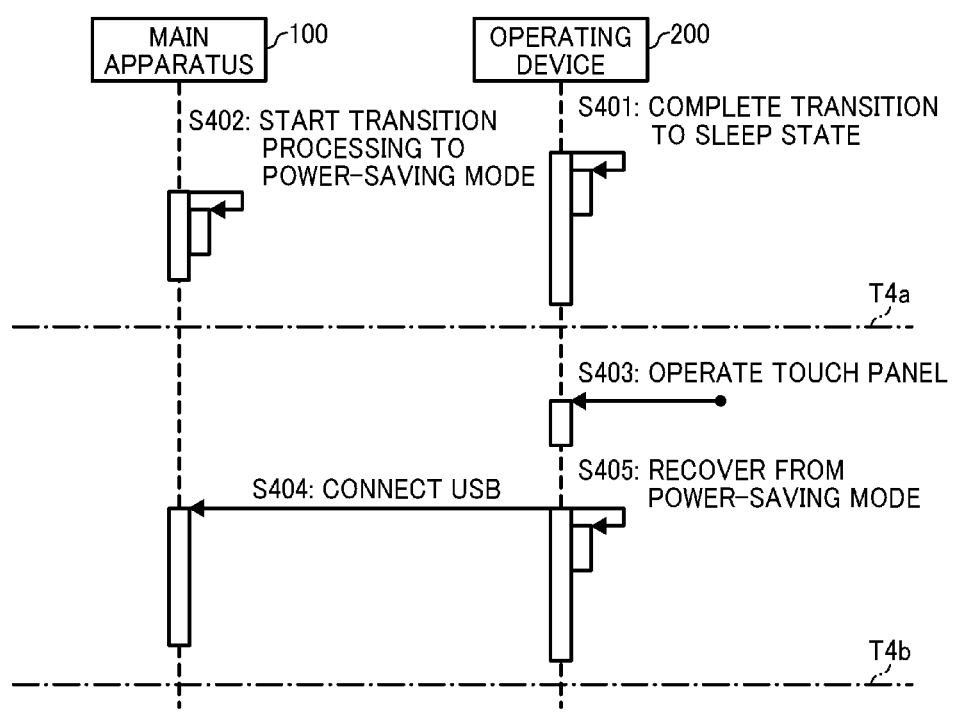
FIG. 4 is a sequence diagram illustrating operation of controlling transition of a multifunction peripheral according to a comparative example.

In the exemplary transition illustrated in FIG. 4, when the operating device 200 is in the sleep state (power-saving mode) (S401), the main apparatus 100 starts transition processing to the power-saving mode from the normal operating mode (S402). In this situation, for example, when the user operates the touch panel of the display 207 (S403) before the main apparatus 100 completes the transition processing to the power-saving mode, the operating device 200 requests the main apparatus 100 for the USB connection, namely, performs request processing (S404).

After that, the operating device 200 completes the recovery processing from the power-saving mode, and the power control state of the operating device 200 returns to the normal operating mode (S405). Regarding the main apparatus 100, the power control state is in the middle of the transition to the power-saving mode from the normal operating mode during a period from the start of the transition processing to the power-saving mode (S402) to the completion of the transition processing, which is a timing of T4*b*.

This means that a period from a timing T4*a* to the timing T4*b*, which is a part of transition period for transitioning to the power-saving mode at the main apparatus 100, is also a period in which the electrical damage may occur to the main apparatus-device connection I/F 106 of the main apparatus 100 that is a USB host. Occurrence of such a state may damage the main apparatus 100.

Figure 5:
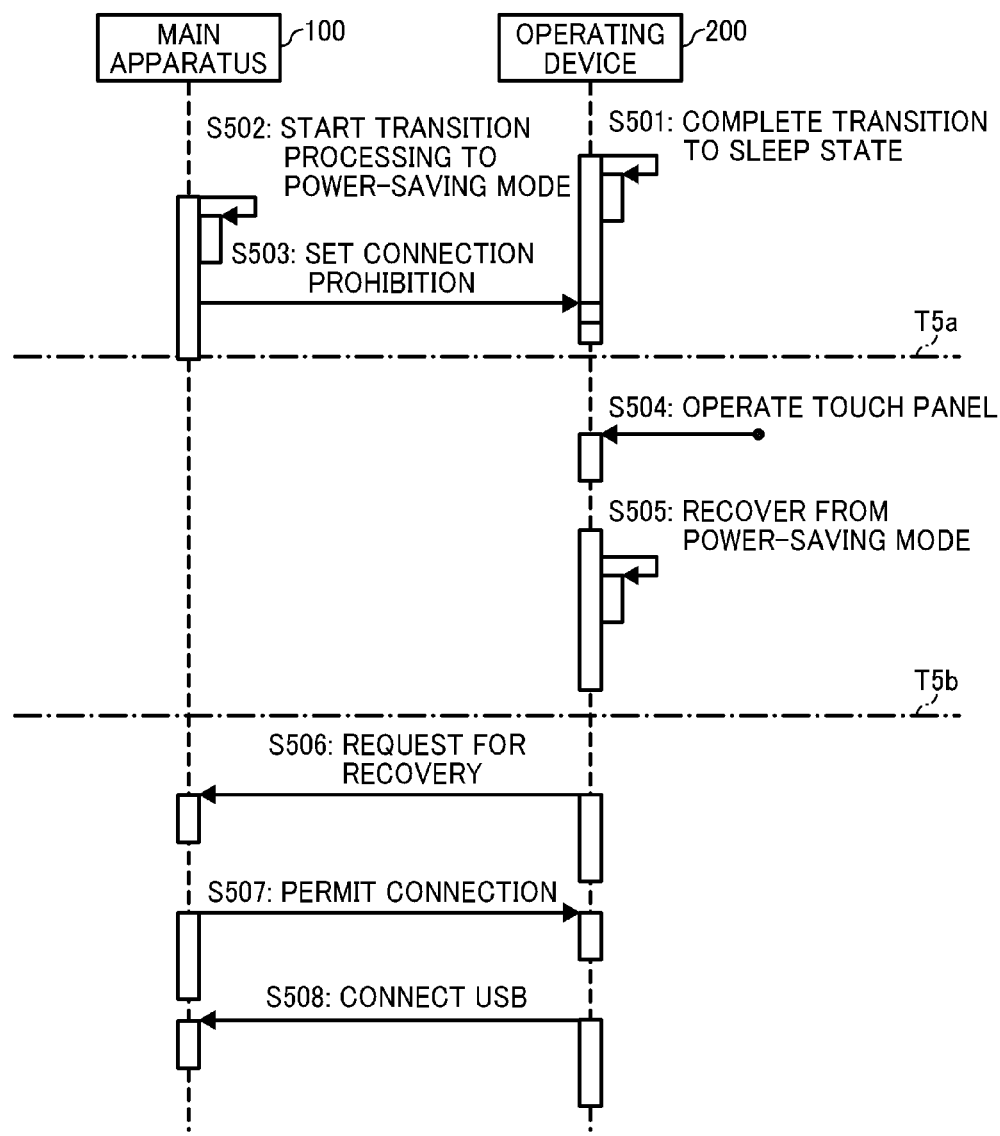
FIG. 5 is a sequence diagram illustrating operation of controlling transition of the multifunction peripheral according to an embodiment.

To cope with this issue, in the MFP 1 according to the embodiment, as described in FIG. 5, the main apparatus 100 sends the connection prohibition notification to the operating device 200 (S503), when the transition processing to the power-saving mode from the normal operating mode is started (S502), under the condition where the operating device 200 is in the sleep state (power-saving mode) (S501). In sending the connection prohibition notification, the main apparatus-power-saving control unit 11 controls the connection prohibition notification unit 13 based on the determination of the power-saving determination unit 12, and then the connection prohibition notification unit 13 notifies the operating device 200 of the connection prohibition (S503) according to the control according to the determination of the power-saving determination unit 12. At that time, the connection prohibition notification unit 13 notifies the operating device 200 of the connection prohibition, when the power-saving determination unit 12 determines that a combination of power control states of the main apparatus 100 and the operating device 200 transitions to a state that may cause a trouble to the first communication path 300.

As described above, when the operating device 200 is in the power-saving mode and the main apparatus 100 is making a transition to the power-saving mode from the normal operating mode, the main apparatus 100 prohibits the operating device 200 from sending the connection request attributable to a succeeding change of the state of the operating device 200. This prevents the occurrence of the electrical damage to the main apparatus 100, and thus prevents defects of the main apparatus 100.

Accordingly, the operating device 200 does not request the main apparatus 100 for the USB connection, even when the user operates the touch panel of the operating device 200 (S504). The operating device 200 waits for the main apparatus 100 to complete the transition processing of the power control state from the normal operating mode to the power-saving mode. During this period (from a timing T5*a* to a timing T5*b*), the main apparatus 100 completes the transition from the normal operating mode to the power-saving mode.

In the period from the timing T5*a* to the timing T5*b*, when the operating device 200 completes recovering processing and the power control state of the operating device 200 recovers from the power-saving mode to the normal operating mode (S505), the power control state of the main apparatus 100 is in the power-saving mode. Then, the second recovery request notification unit 24 notifies the main apparatus 100 of the recovery request (S506). The main apparatus 100 sends the connection permission notification from the connection permission notification unit 14 in response to the receipt of the recovery request from the operating device 200 (S507).

The operating device 200 requests for the USB connection to the main apparatus 100 after waiting for the connection permission notification from the main apparatus 100. This reduces a waiting time for the user, thus improving user operability of the MFP 1.

Next, exemplary transition of the power state in rebooting of the MFP 1, which includes the main apparatus 100 and the operating device 200, is explained. The power control, according to the embodiment, as described above, also provides similar advantages in rebooting (restarting) of the MFP 1.

As described above, the main apparatus 100 and the operating device 200, which configures the MFP 1, operate individually and independently so that reboot of each device is performed separately. In a situation, for example, where the operating device 200 takes a longer time to reboot than the main apparatus 100 does, the operating device 200 is controlled to temporarily remain in the power-saving mode without starting rebooting at a time when the main apparatus 100 starts rebooting, and then the operating device 200 recovers from the power-saving mode to the normal operating mode when the main apparatus 100 completes rebooting. By performing the power control as described above, it seems as if both of the main apparatus 100 and the operating device 200 were booting.

Figure 6:
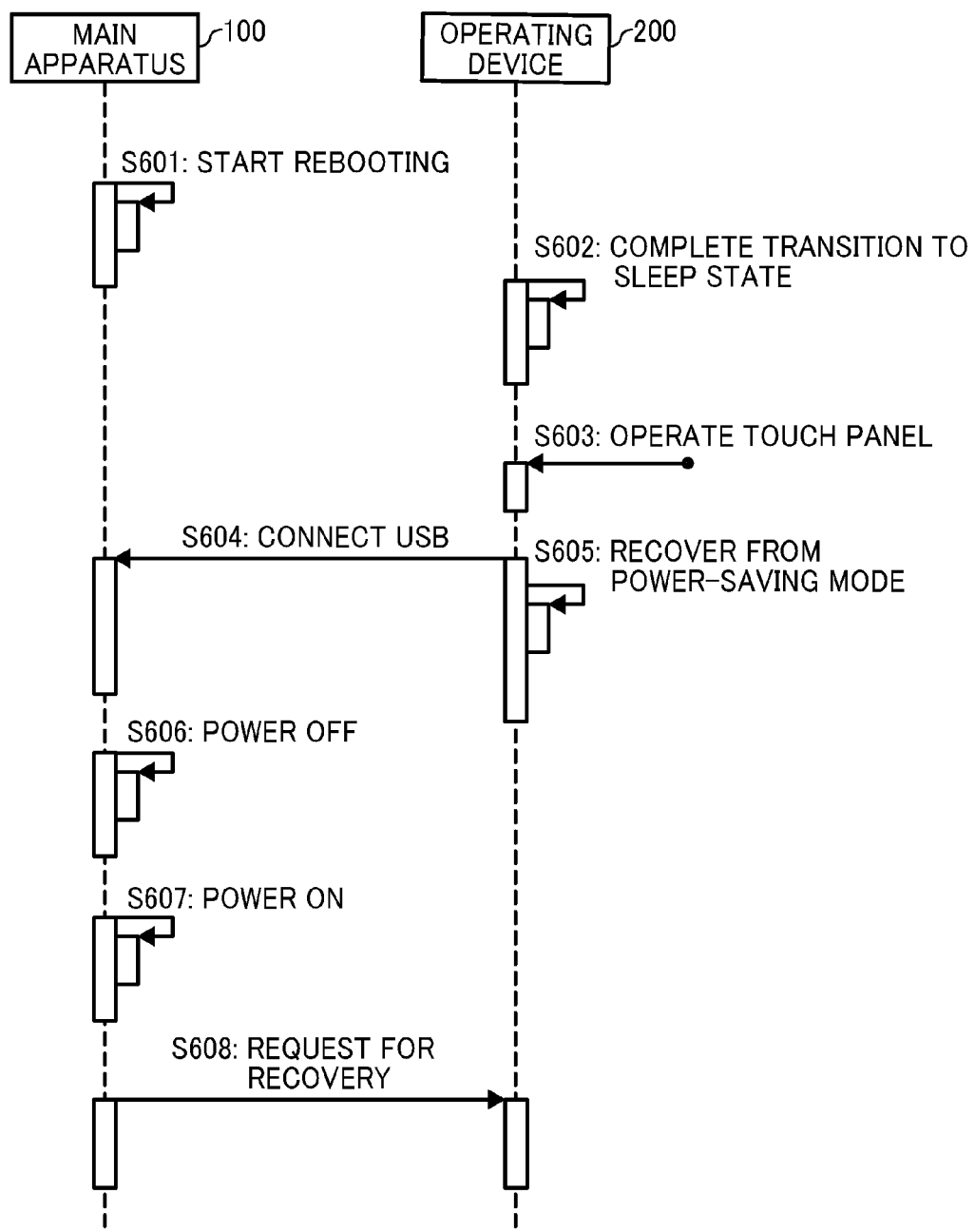
FIG. 6 is a sequence diagram illustrating operation of controlling transition of a multifunction peripheral according to a comparative example.

For example, as described in FIG. 6, the operating device 200 is in the power-saving mode (S602) during a period from when the main apparatus 100 starts rebooting (S601) to when the main apparatus 100 turns off (S606). In this situation, when the user operates touch panel of the display 207 of the operating device 200 being in the power-saving mode (S603), the operating device 200 requests for the USB connection to the main apparatus 100 (S604).

Subsequently, the operating device 200 completes the recovery processing from the power-saving mode, and the power control state of the operating device 200 recovers from the power-saving mode to the normal operating mode (S605). At that time, the main apparatus 100 is in the middle of the rebooting, and powers off after processing the request for the USB connection from the operating device 200 (S606), and then the main apparatus 100 powers on (S607). The main apparatus 100 then sends the recovery request to the operating device 200 (S608)

In this situation, a period from when the operating device 200 requests for the USB connection to the main apparatus 100 to when the main apparatus 100 notifies the operating device 200 of the recovery request (from S604 to S 607), is a period where the electrical damage may be applied to the main apparatus-device connection I/F 106 in the main apparatus 100, which is the USB host. Occurrence of such a state may damage the main apparatus 100.

To prevent this issue, the main apparatus 100 notifies the operating device 200 of the connection prohibition (S702) in starting rebooting (S701), as described in FIG. 7.

After that, even if the user operates the touch panel of the operating device 200 (S704) under a condition where the operating device 200 is in the sleep state (power-saving mode) (S703), the operating device 200 that receives the connection prohibition notification does not request for the USB connection to the main apparatus 100.

After accepting the operation of touch panel, the operating device 200 recovers from the normal operating mode to the power-saving mode (S705). After that, the main apparatus 100 in rebooting once turns off and then turns on again (S707). Subsequently, the first recovery request notification unit 15 notifies the operating device 200 of the recovery request (S708)

The main apparatus 100 then sends the connection permission notification from the connection permission notification unit 14 to the operating device 200. The operating device 200 waits for receiving the connection permission notification from the main apparatus 100, and requests for the USB connection to the main apparatus 100 after receiving the connection permission notification.

As described above, when the operating device 200 is in the power-saving mode and the main apparatus 100 is making a transition to the power-saving mode from the normal operating mode, the main apparatus 100 prohibits the operating device 200 from issuing the connection request attributable to a succeeding change of the state of the operating device 200. This can prevent occurrence of the electrical damage to the main apparatus 100, further preventing a defect of the main apparatus.

The operating device 200 waits for receiving the connection permission notification from the main apparatus 100, so that a waiting time for the user is reduced, improving user operability of the MFP.

In the MFP 1, according to the embodiment described above, the communication of the connection prohibition and the connection permission is performed using the second communication path 400.

The embodiment of the disclosure is not limited to the description above, but the communication of the connection prohibition and the connection permission can be performed using software by emulation. By using the software, any dedicated signal lines to perform the communication of the connection prohibition and the connection permission are not needed and thus the cost for the MFP 1 can be reduced.

The process for the power-saving function, which includes the communication of the connection prohibition and the connection permission, performed in the MFP 1, according to the embodiment described above, is performed by circuitry that executes software serving as the function units as illustrated in FIGS. 2 and 3. The software program is stored in a storage media such as a storage device including the HDD 104 and the ROM 102 in the main apparatus 100 and the flash memory 204 and the ROM 202 in the operating device 200 in FIG. 1. The CPU 101 of the main apparatus 100 and the CPU 201 of the operating device 200 in the image processing apparatus execute the program using the RAM 103 and RAM 203 as a buffer or a work area, respectively. Alternatively, a part of the program may be downloaded from a network via the communication lines to be executed by the CPUs 101 and 201.

The program also may be distributed to devices such as personal computers via the storage media using a communication network such as the Internet.

That is, the program may be provided by being installed in advance to the hard disk serving as a storage media built-in the computer device. The storage media may store the program temporarily or permanently. The program may be installed in the computer as a unit, or may be provided as packaged software by using a portable storage media.

Such storage media includes, for example, a flexible disk, a compact disk read only memory (CD-ROM), a magneto optical (MO) disk, a digital versatile disk (DVD), a blu-ray disk (BD), a magnetic disk, and semiconductor memory.

The program may be downloaded from a download site via a network including a local area network (LAN) or the Internet and transferred to a computer using wired or wireless communication so that the program may be downloaded in the storage device such as a hard disk built-in the computer.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An apparatus having a power-saving function, comprising:
   first circuitry to control a transition of a power control state of the apparatus between a power-saving mode and a normal operating mode; and
   first communication circuitry to connect with an operating device to enable receipt of a user instruction from the operating device, the operating device including second circuitry to control a transition of a power control state of the operating device between the power-saving mode and the normal operating mode, wherein the first circuitry is configured to
   monitor the power control state of the apparatus and the power control state of the operating device to determine whether to connect the operating device to the apparatus according to a combination of the power control state of the apparatus and the power control state of the operating device;
   send a notification indicating to prohibit connection between the apparatus and the operating device according to a determination to prohibit the operating device from connecting to the apparatus; and
   send notification indicating to allow connection between the apparatus and the operating device according to a determination to allow the operating device to connect to the apparatus,
   wherein the first circuity is configured to prohibit the operating device from connecting to the apparatus upon the power control state of the operating device completing a transition from the normal operating mode to the power-saving mode and upon the power control state of the apparatus starting transitioning from the normal operating mode to the power-saving mode, and
   wherein the first circuitry is configured to allow the operating device to connect to the apparatus upon the power control state of the apparatus completing the transition to the power-saving mode after the notification indicating to prohibit connection between the apparatus and the operating device is sent.

2. The apparatus of claim 1, wherein the first circuitry is configured to send the notification indicating to prohibit connection between the apparatus and the operating device and the notification indicating to prohibit connection between the apparatus and the operating device by emulation.

3. A system having a power-saving function, comprising:
   the apparatus of claim 1; and
   the operating device including the second circuitry.

4. The apparatus of claim 1, wherein the first circuitry is configured to determine to allow the operating device to connect to the apparatus is made upon the power control state of the apparatus completing the transition to the power-saving mode after the notification indicating to prohibit connection between the apparatus and the operating device is sent and upon a recovery request being received from the operating device.

5. The apparatus of claim 1, wherein the apparatus is further connected to the control device with second communication circuitry that is different from the first communication circuitry, wherein the first circuitry is configured to send the notification indicating to prohibit connection between the apparatus and the operating device and the notification indicating to allow connection between the apparatus and the operating device with the second communication circuitry.

6. A non-transitory computer usable medium including a computer-readable program, wherein the computer-readable program, when executed on a computer, causes the computer to:
   monitor a power control state of an apparatus having a power-saving function and a power control state of an operating device, in communication with the apparatus, to determine whether to connect the operating device to the apparatus according to a combination of the power control state of the apparatus and the power control state of the operating device;
   send a notification indicating to prohibit connection between the apparatus and the operating device according to a determination to prohibit the operating device from connecting to the apparatus; and
   send a notification indicating to allow connection between the apparatus and the operating device according to a determination to allow the operating device to connect to the apparatus,
   wherein the determination indicating to prohibit connection between the apparatus and the operating device is determined upon the power control state of the operating device completing a transition from a normal operating mode to a power-saving mode and upon the power control state of the apparatus starting transitioning from the normal operating mode to the power-saving mode, and
   wherein the determination indicating to allow connection between the apparatus and operating device is determined upon the power control state of the apparatus completing the transition to the power-saving mode after the notification indicating to prohibit connection between the apparatus and the operating device is sent.

7. The non-transitory computer usable medium of claim 6, wherein the computer-readable program, when executed on a computer, causes the computer to make the determination to allow the operating device to connect to the apparatus upon the power control state of the apparatus completing the transition to the power-saving mode after the notification indicating to prohibit connection between the apparatus and the operating device is sent and upon a recovery request being received from the operating device.

8. The non-transitory computer usable medium of claim 6, wherein the computer-readable program, when executed on a computer, causes the computer to send the notification, indicating to prohibit connection between the apparatus and the operating device, and to send the notification, indicating to prohibit connection between the apparatus and the operating device, by emulation.

9. An apparatus having a power-saving function, comprising:
   first circuitry to control a transition of a power control state of the apparatus between a power-saving mode and a normal operating mode; and
   first communication circuitry configured to connect with an operating device to receive a user instruction from the operating device, the operating device including second circuitry to control a transition of a power control state of the operating device between the power-saving mode and the normal operating mode,
   wherein the first circuitry is configured to:
      monitor the power control state of the apparatus and the power control state of the operating device to determine whether to connect the operating device to the apparatus according to a combination of the power control state of the apparatus and the power control state of the operating device,
      send a notification indicating to prohibit connection between the apparatus and the operating device according to a determination to prohibit the operating device from connecting to the apparatus, and
      send a notification indicating to allow connection between the apparatus and the operating device according to a determination to allow the operating device to connect to the apparatus,
   wherein the first circuitry is configured to determine to prohibit the operating device from connecting to the apparatus upon the apparatus starting rebooting, and
   wherein the first circuitry is configured to determine to allow the operating device to connect to the apparatus upon the apparatus completing rebooting after the notification indicating to prohibit connection between the apparatus and the operating device is sent.

10. The apparatus of claim 9, wherein the first circuitry is configured to determine to prohibit the operating device from connecting to the apparatus upon the power control state of the operating device being one of a state transitioning from the normal operating mode to the power-saving mode and a state being completed the transition from the normal operating mode to the power-saving mode and upon the apparatus starting rebooting.

11. The apparatus of claim 9, wherein the apparatus is connected to the control device with second communication circuitry, different from the first communication circuitry, and wherein the notification indicating prohibition of connection and the notification of allowance of connection between the apparatus and the operating device are to be sent via the second communication circuitry.

12. The apparatus of claim 9, wherein the first circuitry is configured to send the notification indicating to prohibit connection between the apparatus and the operating device and the notification indicating to prohibit connection between the apparatus and the operating device by emulation.

13. A system having a power-saving function, comprising:
   the apparatus of claim 9: and
   the operating device including the second circuitry.

* * * * *